Patented Dec. 8, 1931

1,835,766

UNITED STATES PATENT OFFICE

CARLETON ELLIS, OF MONTCLAIR, NEW JERSEY

PAPER OR OTHER FIBROUS PRODUCT

No Drawing. Application filed December 8, 1926, Serial No. 153,461. Renewed February 5, 1931.

This invention relates to sulphur products and to a process of making same and relates especially to such products containing a modifying agent incorporated with the sulphur which renders the latter capable of wider uses in the arts.

The modifying agent which I employ is one which dissolves in sulphur in suitable proportions or is capable of being dispersed in molten sulphur or being miscible with hot sulphur, to modify the melting point, and to substantially prevent or greatly retard crystallization and so forth. Such blends of sulphur and sulphur-soluble resin, I hereinafter term "resinated sulphur."

Preferably I employ a fixed or non-volatile oil or solid substance preferably non-crystalline, desirably a resinous body, as the modifying agent.

In my copending applications, Serial Nos. 12,360 and 36,840 and copending Patents 1,676,604 and 1,690,335, I have called attention to the property of various sulphurized bodies, some of a generally resinous character, in modifying the texture, strength and other qualities of sulphur; describing especially resins made by treating phenol with sulphur monochloride.

In the present invention in certain phases thereof I prefer to use instead of phenol itself various phenolic or phenoloid bodies capable of reacting with sulphur or reagents containing sulphur such as sulphur chloride. The various grades of cresylic acid and coal tar acids containing some phenol or preferably the more inexpensive grades from which the phenol has been removed (either entirely or largely) are suitable for carrying out the present invention.

In commerce there are several grades of coal tar acids called crude cresylic acids but which contain some of the xylenols. For example a grade, one-half of which distills below 207° C. contains perhaps 30 per cent orthocresol, 20 per cent metacresol and 15 per cent paracresol; the balance (40%) of the tar acid content probably being made up almost entirely of the lowest boiling xylenol. On distillation of another grade of so-called crude cresylic acid or tar acid about 50 per cent will pass over at a temperature ranging up to 212° C., this grade containing probably 30 to 40 per cent of cresol (largely as meta and paracresol) the balance being xylenols in varying proportions.

If the latter grade which more correctly should be termed crude cresols and xylenols rather than crude cresylic acids, is treated with its own weight of sulphur chloride a resin is formed which is employed to advantage in the preferred embodiment of the present invention.

The resin may be made by adding sulphur monochloride to an equal amount of the tar acid, with stirring, the reagent preferably being added slowly as the reaction is violent. A diluent such as benzol or toluol may be present, for example an amount equal in volume to the tar acid. This allows the reaction to take place somewhat more smoothly. Hydrochloric acid is given off and this may be absorbed and recovered. The resinous material made with or without diluent usually has a disagreeable odor and should be deodorized and well-neutralized for best results.

One feature of the invention involves incorporating the modified sulphur with paper or other fibrous material for making various articles where any decided "chemical" or tarry odor would be objectionable and where any hydrochloric acid might be destructive.

A simple means of deodorizing is that of blowing air or steam through the resin at a temperature of about 150° C. This may be carried out if desired in vacuo in a manner similar to that employed in the deodorizing of cottonseed oil.

In any event it will be found that it is possible to vary materially deodorize the resin by such blowing treatment and at the same time hydrochloric acid is usually removed completely or sufficiently so that no special neutralizing reagent is required. The use of such reagent however is not precluded. The proportion of sulphur chloride to the tar acid may be varied but by using equal weights of the two reacting substances a resin is obtained which is readily miscible or blendable with molten sulphur and has a surprising effect in modifying its melting point and other characteristics.

If a considerably larger proportion of sulphur chloride is employed the miscibility is not so satisfactory, while if lower proportions are used there is likely to be some intermediate products formed which are not as efficient. However as stated I may vary the proportion of the sulphur monochloride as desired and such variation oftentimes is a needful consideration when treating products as variable in composition as tar acid distillates.

The use of sulphur dichloride or mixtures of sulphur monochloride or dichloride or sulphuryl chloride and other substances capable of yielding sulphurized products useful for the present purpose is not precluded.

The resin or other modifying agent may be added to the sulphur in a molten state, for example by heating the sulphur to 130–140° C., adding the modifying material and stirring to create a proper blend or solution or dispersion. The sulphur and its modifying agent may however be mixed in any other suitable manner.

*Example 1.*—100 parts by weight of sulphur monochloride was slowly added to a mixture of 150 parts of toluol and 100 parts of tar acids of which 50 per cent boiled above 212° C. During the addition of the sulphur chloride the reaction mixture was stirred constantly. The solvent was then removed by distillation and steam was blown into the resin while the latter was heated on an oil bath at 140–150° C. A clear hard resin was obtained with a melting point of 91.5° C. according to the ball and ring method. The resin was melted together with sulphur in the proportion of one part of the former to three parts by weight of the latter. The composition on cooling was uniform, did not separate nor crystallize. By the ball and ring method the melting point was found to be 105° C. Thus the melting point of sulphur was reduced approximately 15 degrees by incorporation with the resin.

The resinated sulphur prepared in this manner from 3 parts of sulphur and 1 part of sulphurized cresol and xylenol resin may be admixed with asbestos fibre, china clay, powdered mica and similar fillers or with wood flour, cedar dust or chips, and the like to make compositions which can be molded on hot pressing. In such cases it is desirable to have the melting point as high as is consistent with avoidance of crystallization. As a rule 10 per cent of the resin on the weight of the sulphur is the minimum for this prescribed condition, this gives a product of higher melting point than that with 25 per cent of resin.

Using equal parts of sulphur and the resin prepared according to the above example the melting point falls considerably, products having a melting or softening point as low as 65° C. (i. e. the mixture melting lower than either the sulphur or the resin) having been obtained.

In the preferred form the product comprises a major proportion of sulphur and a minor proportion of a sulphurized homologue-of-phenol resin. Preferably the sulphurized homologue-of-phenol is present in substantially a minor proportion (i. e. less than the amount of sulphur). Sulphur is cheaper than the resin and the maximum amount of the former which can be used to meet the requirements of the particular usage in hand is preferably employed. On the other hand for making low melting products or those in which a major proportion of resin is desired for special purposes the product may contain sulphur in minor proportion (i. e. more resin than sulphur).

Thus products comprising sulphur and a substance miscible with molten sulphur and lowering the melting point thereof may be obtained over a considerable range; from products having melting point slightly below sulphur to those melting at many degrees below the melting point of sulphur.

Another form of the invention is a product comprising fibrous sheeted material coated and impregnated with sulphur and a substance compatible therewith containing chemically-combined sulphur. In some cases the fibrous sheeted material such as paper or cloth may simply be glazed with non-crystalline sulphur or resinated suphur obtained in this manner. Pulp board or pressboard, laminated board and card board thus may be impregnated and surfaced with the resinated sulphur or the impregnation may be omitted and simply a glazed or enameled surface obtained by means of a coating of such material. When cardboard or pressboard is impregnated with a composition such as that set forth in Example 1, the impregnation being carried out by dipping the board into the composition maintained in molten state at a temperature of between 140 and 150° C., the impregnated product will be found to have a glazed or glossy surface and to be very strong and rigid. The impregnated material may be bent while warm into suitable shapes to make boxes or other containers. Or cardboard or pulp board boxes may be dipped into the molten mixture to impregnate the article after it has been suitably shaped. The gloss is improved by allowing the impregnated material to drain in a hot room for a short time.

Paper, cardboard, pressboard or articles made therefrom may be coated or glazed by spraying thereon the composition containing the sulphur and the modifying agent. Paper may be sized with the composition by introducing it into the beater engine in the form of an emulsion (or suspension) or applying it in other ways.

A more specific embodiment is that of making hood caps for bottles such for example as milk bottles. In this case the employment of a deodorized resin is desirable, as the crude resin might deteriorate the flavor of the milk. The composition may be applied to such hood caps by dipping, spraying or otherwise preferably to coat the crimped portion to a sufficient degree to serve as a seal. The paper cap with its sealing agent is warmed until the latter becomes plastic and then is clamped around the flange at the mouth of the bottle and the composition allowed to set so as to seal the cap in place. Instead of using simply a coating it is possible to make up laminated hood caps by using two or three layers or plies, one or more of which is coated or impregnated with the sulphur and deodorized miscible resin. For example a sheet of paper may be passed through a bath of the composition maintained at a temperature between 140 and 150° C. and then through squeeze rolls or over scrapers to remove any surplus of the waterproofing and sealing agent. Two sheets of paper without the sulphur composition are brought in contact, one on either side of the sulphur-impregnated sheet before the latter has had opportunity to set and the whole run through rolls or calenders to weld the three plies together. In this manner the outside ply may be of white paper, the interior ply containing the sulphur will be darker in color, and the ply next to the bottle may be of any suitable color. The plies forming the surface may be subsequently sprayed with paraffin wax or other wax or preferably the paper used for this purpose, if it is desired to have stock light in color, may be sized in the beater engine with from 2 to 5 per cent of paraffin wax which is added in the form of an emulsion. The emulsion may be set in any appropriate manner depending upon its character. For example emulsions made with wax and soaps may be set with alum. Emulsions made with paraffin wax, rosin and a small amount of alkali may be set with alum or soluble lime salts. An emulsion of paraffin wax, starch and alkali may be set simply by neutralizing. If 5 per cent or so of oleic acid or stearic acid is melted with paraffin and the latter beaten up with warm water containing ammonia a good emulsion may be obtained. It is desirable to add the paraffin emulsion to the beater engine as soon as the charge of paper stock or pulp is introduced and add the setting agent just before discharging the beater.

Paper made from cotton is very easily impregnated with the molten resinated sulphur composition and may be used for the intermediate layer of the three ply hood cap.

In like manner bags for Portland cement, plaster of Paris and other substances affected by water or moisture may be made from the three ply paper basis having the inner ply impregnated with resinated sulphur as aforesaid and the outer plies rendered water-repellent by means of the paraffin wax emulsion set forth above.

The composition herein described may be employed for impregnating or coating cloth and other textile materials including roofing felt and the like. It will be understood that such materials as roofing felt, here referred to, must be able to withstand out-of-doors conditions, including weather conditions, direct sun, rain, heat and cold, and frequently other unfavorable conditions.

In the foregoing I have employed as my specific illustration the sulphurized cresol or sulphurized xylenol resins or mixtures of these but it should be understood that I may use other substances such as sulphurized terpenes, naphthalene, cymene, resorcin and the like or other bodies sulphurized or unsulphurized insofar as they function in the same manner.

Sulphur in its various forms, crude or refined, flowers of sulphur and other forms of sulphur may be employed in accordance with the present invention.

A large part of the foregoing material is continued from my co-pending aplication Serial No. 21,425, filed April 7, 1925 (now Patent 1,690,335).

The employment of sulphur alone as a binding agent is attended with the difficulty that, after melting and cooling sulphur, a change takes place in the crystalline character of the solidified material. At the time of solidification the crystalline structure is monoclinic. On standing for a few hours (or days) conversion to the rhombic form occurs with change of volume. In the case of hood caps, this may result in loosening of the cap to a considerable degree. By the employment of resinated sulphur the change is retarded or completely checked, depending upon the amount of the modifying resin which is present. Thus 5 to 10% of such resin may be used to check the change only long enough to keep the binding element of the hood cap in good condition during the short period it is required for use on, for example, a milk bottle.

An advantage in using resinated sulphur over sulphur alone, in the impregnation of paper, is its lower melting point, which precludes the necessity of heating the paper to a temperature at which it may become very brittle.

Heavy pressboard, impregnated with resinated sulphur, may be used in making advertising signs. When employed in this manner a nitrocellulose lacquer may be employed to coat the signboard. A linseed oil paint is slow drying in contact with sulphur, whereas the nitrocellulose coating dries quickly, and is not affected by the sulphur or the sulphur resin.

The paper material which has been treated with sulphur or resinated sulphur and employed to make articles such as hood caps, may produce considerable waste or cuttings. This waste or scrap material may be heated with milk of lime to break down into pulp and form sulphide of lime. The latter may be separated from the pulp or the mixture of the pulp and sulphide may be rendered acid to precipitate the sulphur, and the mixture of pulp and sulphur added to the beater and admixed with fresh pulp.

In some cases the scrap may be ground and hot-pressed to produce molded articles.

Still another article which may be prepared from the impregnated paper is a receptacle for plants. Flower pots of paper have heretofore been produced, but these are very perishable. When the paper structure of these pots is impregnated and the surface glazed with resinated sulphur, a more durable receptacle results.

Ordinary sulphur is very easily ignited and gives off suffocating fumes. For many purposes this is undesirable and in the present invention in one form I employ a quantity of the sulphur resin sufficient to retard or inhibit the combustion of the sulphur, as I have found that this sulphur resin, despite the fact that it would be expected to be inflammable, has the property when mixed with sulphur of changing the combustion qualities of the latter completely.

One part of the resin added to nine parts of sulphur permits the combustion when a Bunsen flame is applied to a fragment thereof. One part of the resin to three parts of sulphur greatly retards the combustion and one part of resin to two parts of sulphur renders the sulphur practically unignitable.

Paper and similar combustible materials, impregnated with a mixture of sulphur and sulphur resin, impregnated with mixtures not readily combustible, of course is less readily inflammable than the untreated paper.

What I claim is:—

1. A product comprising fibrous material, sulphur and a sulphurized homologue-of-phenol compatible therewith.

2. A product comprising fibrous sheeted material coated and impregnated with sulphur and a sulphurized tar acid containing a plurality of homologues of phenol compatible therewith.

3. A product comprising paper coated and impregnated with sulphur and a sulphurized homologue of phenol compatible therewith.

4. Pressboard glazed with a mixture of sulphur and a sulphurized homologue of phenol.

5. Pressboard glazed with a mixture of sulphur and a substance compatible therewith containing chemically-combined sulphur.

6. A product comprising multiply fibrous sheeted material coated and impregnated with sulphur and a substance compatible therewith containing chemically-combined sulphur.

7. Pressboard glazed with resinated sulphur.

8. Paper material made up of several plies, a part only of said plies carrying resinated sulphur.

9. Multi-ply paper carrying sulphur resinated with a sulphurized homologue-of-phenol.

10. Multi-ply paper, at least one ply being impregnated with resinated sulphur.

11. Multi-ply paper material, a part only of the total number of plies being impregnated with a non-crystalline sulphur composition.

12. Paper material impregnated with sulphurized cresol-xylenol resin.

13. Fibrous material carrying sulphur and a substance compatible therewith containing chemically-combined sulphur.

14. Multi-ply paper including at least one ply impregnated with a non-crystalline composition containing sulphur and at least another ply being impregnated with a waxy water-proofing agent.

15. Fibrous material carrying a mixture of sulphur and a sulphurized homologue of phenol resin, which mixture upon cooling from the molten state, does not promptly crystallize, as would sulphur alone.

16. Sheet form textile materials adapted for outside exposure, impregnated with a composition which includes a sulphur-containing resin.

17. Roofing felt impregnated with a composition which includes a sulphur-containing resin.

18. Fibrous cellulosic material impregnated with a composition of matter comprising sulphur carrying a substance which is soluble in molten sulphur and which remains thoroughly incorporated with the sulphur when the latter solidifies from the molten state, and which substance acts to substantially retard the crystallization of sulphur when the latter solidifies from the molten state.

19. A product comprising sheet-form paper material and a mixture of sulphur and sulphur resin incorporated therewith.

20. An article which is normally combustible, glazed with a mixture of sulphur and sulphur resin.

21. An article comprising an inflammable material coated or impregnated with a composition comprising sulphur and a sulphur resin miscible therewith, in proportion to render the article less readily inflammable than the base material.

CARLETON ELLIS.